(12) United States Patent
Critchfield et al.

(10) Patent No.: US 11,071,944 B2
(45) Date of Patent: Jul. 27, 2021

(54) ABSORBENT COMPOSITION FOR THE SELECTIVE ABSORPTION OF HYDROGEN SULFIDE

(71) Applicant: SHELL OIL COMPANY, Houston, TX (US)

(72) Inventors: James Edward Critchfield, Austin, TX (US); Diego Patricio Valenzuela, Amsterdam (NL); Loren Clark Wilson, Katy, TX (US); Jingjun Zhou, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 492 days.

(21) Appl. No.: 14/402,382

(22) PCT Filed: May 29, 2013

(86) PCT No.: PCT/US2013/043102
§ 371 (c)(1),
(2) Date: Nov. 20, 2014

(87) PCT Pub. No.: WO2013/181242
PCT Pub. Date: Dec. 5, 2013

(65) Prior Publication Data
US 2015/0157975 A1 Jun. 11, 2015

Related U.S. Application Data

(60) Provisional application No. 61/653,910, filed on May 31, 2012.

(51) Int. Cl.
*B01D 53/14* (2006.01)
*B01D 53/52* (2006.01)
(Continued)

(52) U.S. Cl.
CPC ..... *B01D 53/1493* (2013.01); *B01D 53/1468* (2013.01); *B01D 53/526* (2013.01);
(Continued)

(58) Field of Classification Search
None
See application file for complete search history.

(56) References Cited

U.S. PATENT DOCUMENTS 3,347,621 A 11/1964 Papadopoulos et al.
3,965,244 A 6/1976 Sykes, Jr.
(Continued)

FOREIGN PATENT DOCUMENTS

CN 1356157 7/2002
CN 1421264 6/2003
(Continued)

*Primary Examiner* — Daniel Berns
(74) *Attorney, Agent, or Firm* — Charles W. Stewart (57) ABSTRACT

An absorbent composition that is useful in the selective removal of hydrogen sulfide relative to carbon dioxide from gaseous mixtures that comprise both hydrogen sulfide and carbon dioxide and the use thereof. The absorbent composition includes an amine mixture of an amination reaction product of tert-butylamine with a polydispersed polyethylene glycol (PEG) mixture having an average molecular weight within a certain specified range of molecular weights. The amination reaction product may also comprise a first sterically hindered amine and a second sterically hindered amine. The absorbent composition, preferably, includes an organic co-solvent, such as a sulfone compound. A method is also provided for improving the operation of certain gas absorption processes by utilizing the absorbent composition.

7 Claims, 2 Drawing Sheets

(51) Int. Cl.
*B01D 53/78* (2006.01)
*C01B 17/04* (2006.01)
*C01B 17/16* (2006.01)

(52) U.S. Cl.
CPC .......... *B01D 53/78* (2013.01); *C01B 17/0408* (2013.01); *C01B 17/167* (2013.01); *B01D 2252/2026* (2013.01); *B01D 2252/2056* (2013.01); *B01D 2252/20426* (2013.01); *B01D 2252/20431* (2013.01); *B01D 2257/304* (2013.01)

(56) References Cited

U.S. PATENT DOCUMENTS

| | | | |
|---|---|---|---|
| 3,989,811 | A | 11/1976 | Hill |
| 4,080,423 | A | 3/1978 | Smith et al. |
| 4,094,957 | A | 6/1978 | Sartori et al. |
| 4,112,051 | A | 9/1978 | Sartori et al. |
| 4,152,353 | A | 5/1979 | Habermann |
| 4,240,922 | A | 12/1980 | Sartori et al. |
| 4,405,583 | A | 9/1983 | Stogryn et al. |
| 4,471,138 | A | 9/1984 | Stogryn et al. |
| 4,618,481 | A | 10/1986 | Heinzelmann et al. |
| 4,892,674 | A | 1/1990 | Ho et al. |
| 4,894,178 | A | 1/1990 | Ho et al. |
| 4,961,873 | A | 10/1990 | Ho et al. |
| 6,057,442 | A | 5/2000 | Wulff-Doring et al. |
| 7,196,033 | B2 | 3/2007 | Renken et al. |
| 7,683,007 | B2 | 3/2010 | Renken et al. |
| 9,352,271 | B2 | 5/2016 | Su et al. |

FOREIGN PATENT DOCUMENTS

| | | |
|---|---|---|
| CN | 1615173 | 5/2005 |
| CN | 101553304 | 10/2009 |
| CN | 101804296 | 8/2010 |
| CN | 101827917 | 9/2010 |
| CN | 101844035 | 9/2010 |
| CN | 101981107 | 2/2011 |
| CN | 101993378 | 3/2011 |
| WO | 2012074807 | 6/2012 |

ABSORBENT COMPOSITION FOR THE SELECTIVE ABSORPTION OF HYDROGEN SULFIDE

PRIORITY CLAIM

The present application is the National Stage (§ 371) of International Application No. PCT/US2013/043102, filed May 29, 2013, which claims priority from U.S. Provisional Application No. 61/653,910, filed May 31, 2012, the disclosures of which are incorporated herein by reference.

This invention relates to an absorbent composition that is useful in the selective removal of hydrogen sulfide from gas streams containing hydrogen sulfide and carbon dioxide, including use of the absorbent composition, and a method of improving a process for the selective removal of hydrogen sulfide from a gas stream containing hydrogen sulfide and carbon dioxide.

The use of certain amine compounds and solutions for the separation of acidic gases such as $CO_2$, $H_2S$, $CS_2$, HCN, and COS from gaseous mixtures is known in the art of gas treating. One early method of separating acidic gases from gaseous mixtures is disclosed in U.S. Pat. No. 3,347,621. The process disclosed in this patent uses a liquid absorbent that comprises an alkanolamine and a sulfone that is contacted with a gas mixture containing acidic gas components. Examples of other early patents that disclose the use of solutions of alkanolamine and sulfone in the treatment of gaseous mixtures that contain significant concentrations of $H_2S$, $CO_2$ and COS include U.S. Pat. Nos. 3,965,244 and 3,989,811.

In a later patent, U.S. Pat. No. 4,894,178, there is disclosed the use of a mixture of two severely hindered amines in the selective removal of $H_2S$ from gas mixtures that contain both $H_2S$ and $CO_2$. One example presented of a mixture of the two severely hindered amines includes bis(tertiarybutyl aminoethoxy)-ethane (BTEE) and ethoxyethanol-tertiarybutyl amine (EEETB). This mixture is obtained by the one-step catalytic tertiarybutylamination of triethylene glycol to yield a first amine, e.g. BTEE, and a second amine, e.g. EEETB, having a weight ratio of the first amine to second amine in the range of from 0.43:1 to 2.3:1.

The '178 patent indicates that one problem with the use of aqueous solutions of BTEE is that they suffer from phase separation under regeneration conditions. The '178 patent further indicates that EEETB can be used for the selective removal of $H_2S$ in the presence of $CO_2$ and that a mixture of BTEE and EEETB not only provides for better selectivity and higher capacity for $H_2S$ than EEETB alone, it also does not phase separate under regeneration conditions as do aqueous solutions of BTEE.

Prior to the use of the amine mixture that is disclosed in the '178 patent, it is taught that the amine mixture may be contained in a liquid medium such as water, an organic solvent and mixtures thereof. The preferred liquid medium comprises water, but possible other suitable solvents include the physical absorbents described in U.S. Pat. No. 4,112,051. Sulfones, such as sulfolane, are among the suitable physical absorbents. The liquid medium can be a mixture of water and organic solvent and is typically present with the absorbent in an amount in the range of from 0.1 to 5 moles per liter, preferably from 0.5 to 3 moles per liter, of the total absorbent composition. It is not clear, however, what mole units of which the '178 patent is referring.

U.S. Pat. No. 4,961,873 discloses an absorbent composition that comprises a mixture of two severely hindered amines similar to the mixture disclosed in U.S. Pat. No. 4,894,178 with a weight ratio of a first amine to a second amine being in the range of from 0.43:1 to 2.3:1, an amine salt and/or a severely hindered aminoacid. The severely hindered amine mixture and severely hindered amine salt and/or aminoacid additives are dissolved in a liquid medium. The amine mixture and additive of the absorbent composition before it is contained in the liquid medium comprises from 5 to 70 wt % amine mixture, from about 5 to 40 wt % additive, and the balance being water with the weight percent being based on the weight of the total liquid absorbent composition.

As in the '178 patent, the '873 patent teaches that, prior to the use of the liquid absorbent composition that includes the severely hindered amine mixture, it may be contained in a liquid medium such as water, an organic solvent and mixtures thereof. The preferred liquid medium comprises water, but possible other suitable solvents include the physical absorbents described in U.S. Pat. No. 4,112,051. Sulfones, such as sulfolane, are among the suitable physical absorbents. The liquid medium can be a mixture of water and organic solvent and is typically present with the absorbent in an amount in the range of from 0.1 to 5 moles per liter, preferably from 0.5 to 3 moles per liter, of the total absorbent composition. It is not clear, however, what mole units of which the '873 patent is referring.

In the art of gas treating there are ongoing efforts to find new and improved absorbent compositions useful in the removal of acidic gaseous components contained in normally gaseous hydrocarbon streams. For some gas treating applications, it can be desirable to treat gas mixtures that contain both $CO_2$ and $H_2S$ so as to selectively remove from such gas mixtures the $H_2S$ while minimizing the removal of the $CO_2$. Sometimes, a gas stream to be treated for the selective removal of $H_2S$ may already have a low concentration of $H_2S$, relative to its $CO_2$ concentration, that needs to be further reduced. One example of such process gas streams to be treated includes Claus tail gases. These tail gas streams typically have high concentrations of carbon dioxide but relatively low concentrations of hydrogen sulfide, and it is often desirable to selectively remove the $H_2S$ to thereby provide a concentrated stream of $H_2S$ for introduction to a Claus sulfur unit.

Accordingly, provided is an absorbent composition that is useful in the selective removal of hydrogen sulfide from gas mixtures containing hydrogen sulfide and carbon dioxide. The absorbent composition comprises: (a) from 75 wt. % to 98 wt. %, based on the total weight of said absorbent composition, of an aqueous solvent; and (b) from 2 wt. % to 25 wt. %, based on the total weight of said absorbent composition, of an organic co-solvent, wherein said aqueous solvent comprises from 20 wt. % to 70 wt. %, based on the total weight of said aqueous solvent, of an amination reaction product of a polydispersed polyethylene glycol (PEG) mixture having an average molecular weight that is in the range of from 180 to 1000 and t-butylamine, wherein said amination reaction product further comprises at least a first sterically hindered amine and a second sterically hindered amine, and from 30 wt. % to 80 wt. % water, based on the total weight of said aqueous solvent, and wherein said organic co-solvent is selected from the group consisting of sulfones, sulfone derivatives, and sulfoxides.

Another embodiment of the absorbent composition comprises: (a) an aqueous solvent, comprising at least two sterically hindered amines including a first sterically hindered amine and a second sterically hindered amine that are at least partially immiscible at an elevated temperature; and (b) an organic co-solvent present is said absorbent composition at an effective concentration to promote the miscibility of said first sterically hindered amine and said second sterically hindered amine at said elevated temperature.

Yet another embodiment of the absorbent composition comprises an amine mixture of at least a first sterically hindered amine and a second sterically hindered amine; an organic co-solvent selected from the group consisting of sulfones, sulfone derivatives, and sulfoxides; and water.

Also provided is a method for improving a process which utilizes an amine absorbent for the selective removal of hydrogen sulfide from a gas stream that comprises hydrogen sulfide and carbon dioxide. This method comprises providing said amine absorbent composition with at least two sterically hindered amines including a first sterically hindered amine and a second sterically hindered amine and an organic co-solvent at an effective concentration to promote the miscibility of said first sterically hindered amine and said second sterically hindered amine.

Another embodiment of the method for improving a process which utilizes an amine absorbent for the selective removal of hydrogen sulfide from a gas stream comprising hydrogen sulfide and carbon dioxide includes providing said amine absorbent composition with an amination reaction product of a polydispersed polyethylene glycol (PEG) mixture having an average molecular weight that is in the range of from 180 to 1000 and t-butylamine, wherein said amination reaction product further comprises at least a first sterically hindered amine and a second sterically hindered amine, and an organic co-solvent selected from the group consisting of sulfones, sulfone derivatives, and sulfoxides.

The absorption composition of the invention is particularly useful in the selective absorption of hydrogen sulfide from gaseous mixtures that comprise hydrogen sulfide and carbon dioxide. The composition further may have application in the absorption removal of other acidic gases in addition to hydrogen sulfide ($H_2S$).

The gas streams that are to be treated by use of the composition of the invention may be obtained from a wide variety of sources of gaseous mixtures. The gaseous mixtures can include the hydrocarbon-containing gases generated by processes involving pyrolysis of bituminous sands and hydrocarbon-containing gases produced or generated by refinery coker and cracking units and by other crude petroleum refinery operations. Natural gas streams having concentrations of acidic compounds, such as the compounds previously mentioned, can also be treated with the composition of the invention.

Moreover, the composition may be used to treat gas streams that contain very low concentrations of hydrocarbons and, even, no material concentration or substantially no concentration of hydrocarbons or otherwise having a material absence of hydrocarbons. One example of such a gas stream having a very low hydrocarbon concentration, if any, is a Claus unit tail gas stream.

Due to its high selectivity in the absorption of $H_2S$ relative to $CO_2$ and to its high $H_2S$ loading capacity, the absorbent composition of the invention is especially useful in the treatment of Claus tail gas streams. Claus tail gas streams typically have small concentrations of $H_2S$ relative to their concentrations of carbon dioxide, but the $H_2S$ concentrations tend to be too high to permit the streams from being combusted or released into the atmosphere. Therefore, it often is desirable to remove a substantial portion of the $H_2S$ from the tail gas stream and to use the removed $H_2S$ as a recycle feed to the Claus unit. However, it typically is not desirable to recycle $CO_2$ with the recovered $H_2S$ to the Claus unit; because, the $CO_2$ loads up the unit by passing through it unchanged.

Claus unit tail gas streams typically can have an $H_2S$ concentration that is in the range of from or about 0.2 vol. % (2,000 ppmv) to or about 4 vol. % (40,000 ppmv). More specifically, the $H_2S$ concentration can be in the range of from 4,000 ppmv to 15,000 ppmv, and, even, from 6,000 ppmv to 12,000 ppmv.

The $CO_2$ concentration of the tail gas stream can sometimes range upwardly to 90 vol. % of the gas stream, depending upon the particular combustion gas that is used in the thermal step of the Claus unit. For instance, if a pure oxygen combustion gas is used in a thermal step of the Claus unit to burn the $H_2S$, there will be very little nitrogen in the tail gas and a very high concentration of $CO_2$. But, when air is used as the combustion gas, then the $CO_2$ concentration in the tail gas will be much lower and the $N_2$ concentration will be a significant component of the tail gas. Generally, the $CO_2$ concentration in the tail gas is considerably higher than its $H_2S$ concentration, and the $CO_2$ concentration of the tail gas can be in the range of from 1 vol. % (10,000 ppmv) to 60 vol. %. More particularly, the $CO_2$ concentration is in the range of from 2 vol. % to 50 vol. % or from 3 vol. % to 40 vol. %.

In the typical case in which air is the combustion gas of the Claus unit thermal step, the tail gas stream includes a major portion that is molecular nitrogen ($N_2$), which typically is in the concentration range of from 40 to 80 vol. %.

The absorbent composition provides for a treated tail gas having an exceptionally low $H_2S$ concentration of less than 100 volume parts per million (ppmv), but, more specifically, the $H_2S$ concentration of the treated tail gas is less than 50 ppmv. It preferred for the concentration of $H_2S$ in the treated tail gas to be less than 25 ppmv, and more preferred, it is less than 10 ppmv. A practical lower limit for the $H_2S$ concentration of the treated tail gas is 1 ppmv, and, more typically, no lower than about 5 ppmv, but it is understood that it is generally desired for the treated tail gas to have the lowest concentration of $H_2S$ as is possible.

An essential component of the absorbent composition of the invention is the mixture of amine compounds that is included as one of the components of the aqueous solvent of the absorbent composition. It is believed that the particular mixture of amines and its properties contribute to some of the special selectivity and absorption characteristics of the inventive absorbent composition.

The amine mixture component of the aqueous solvent and absorbent composition is an amination reaction product. The amination reaction product is prepared by the catalytic reaction, under suitable reaction conditions as more fully described elsewhere herein, of an amine compound that is, preferably, tert-butylamine, having the formula $(CH_3)_3CNH_2$, with polyethylene glycol, as represented by the following formula: $HOCH_2(CH_2OCH_2)_nCH_2OH$, wherein n is an integer.

One of the attributes of the amine mixture, or amination reaction product, results from the characteristics of the polyethylene glycol (also referred to herein as "PEG") reactant that is used in the preparation of the amine mixture. The PEG reactant does not consist of only a single PEG molecule, but it comprises more than a single PEG molecule.

Preferably, the PEG reactant used in the preparation of the amination reaction product is a mixture comprising two or more or a distribution of different PEG molecules having the aforementioned formula, wherein, for each of the individual PEG molecules, the integer n is a different value. Therefore, the amine mixture is not a reaction product of tert-butylamine and a single molecule of PEG, for example, triethylene glycol, but, instead, it is a reaction product of tert-butylamine with a distribution of PEG molecular compounds.

The mixture of PEG compounds used in preparing the amination reaction product typically includes two or more different PEG compounds having the aforementioned formula, wherein n is an integer selected from values in the range of from 1 to 24. It is preferred for the PEG mixture to comprise two or more molecules of the aforementioned formula, wherein the integer n is selected from the range of integers from 2 to 20, and, preferably from the range of integers from 2 to 18, and, most preferably, from the range of integers from 3 to 15.

The mixture of PEG compounds used as the reactant generally should have an average molecular weight in the range of from 180 to 1,000. Thus, the combination of individual PEG molecules and their relative concentrations in the mixture of PEG compounds used as a reactant in the preparation of the amination reaction product are such as to provide a mixture of PEG compounds having the indicated average molecular weight in the range of from 180 to 1,000. It is preferred for the PEG mixture used as a reactant in the preparation of the amination reaction product to have an average molecular weight that is in the range of from or about 180 to or about 400, and, more preferably, the average molecular weight is in the range of from 200 to 300.

The average molecular weight as used herein is the number average molecular weight as determined by measuring the molecular weight of each PEG molecule of the PEG mixture, summing the weights, and then dividing by the number of PEG molecules of the PEG mixture.

The amination reaction for preparing the amine mixture of the invention is carried out by contacting the reactants, i.e., tert-butylamine, PEG mixture, and hydrogen, with the amination catalyst of the invention under suitable amination reaction conditions to yield the amine mixture, i.e., the amination reaction product.

The selection of an amination catalyst for use in this catalytic reaction is important in providing an amine mixture having the properties and characteristics required of the invention. It is a combination of the characteristics and properties of the PEG reactant along with those of the amination catalyst used in the amination reaction that provides the unique amine mixture of the invention. Therefore, the composition and other characteristics of the amination catalyst can be an important if not a critical aspect of the invention.

The amination catalyst that is used in the preparation of the amine mixture contains catalytically active metal components, including, a nickel (Ni) component, a copper (Cu) component and either a zirconium (Zr) component or a chromium (Cr) component, or both, and, optionally, but preferably, a tin (Sn) component. It may be desirable in some instances for the amination catalyst to have a material absence of or substantial absence of or absence of such a metal as cobalt (Co), or tungsten (W) or molybdenum (Mo), or rhenium (Re) or any combination of one or more thereof. In certain other embodiments of the amination catalyst, it may have a material absence or substantial absence or absence of either zirconium or chromium, but not both metal components.

Possible amination catalyst compositions that may be used in preparing the amine mixture are disclosed and described in U.S. Pat. Nos. 4,152,353; 6,057,442; 7,196,033; and 7,683,007, the disclosures of which are incorporated herein by reference.

In a more specific embodiment of the invention, the amination catalyst comprises: from 40 to 90 wt. % nickel; from 4 to 40 wt. % copper; and from 1 to 50 wt. % of either zirconium or chromium, or a combination of both zirconium and chromium. The amination catalyst may further comprise, and preferably does comprise, from 0.2 to 20 wt. % tin.

The amination catalyst of the invention may be prepared by any of a variety of methods known to those skilled in the art to make a catalyst of the aforedescribed composition; provided, that such a catalyst may suitably be used in preparing the amine mixture of the invention. One example of a method of preparing the amination catalyst is by peptizing powdered mixtures of hydroxides, carbonates, oxides, or other salts of the metal (nickel, copper, zirconium, chromium, and tin) components with water in proportions so as to provide a composition as defined herein, and subsequently extruding and heat-treating the resulting composition.

The amination reaction may be conducted with any suitable reactor arrangement or configuration and under any suitable reaction conditions that provide for the desired amination reaction product. Examples of possible reactors for carrying out the amination reaction include fixed-bed reactors, fluid-bed reactors, continuous stirred reactors, and batch reactors.

The first sterically hindered amine is selected from the group of amine compounds having the following formula:

wherein x is an integer in the range of from 2 to 16, preferably, from 3 to 14.

The second sterically hindered amine is selected from the group of amine compounds having the following formula:

wherein x is an integer in the range of from 2 to 16, preferably, from 3 to 14.

In certain embodiments of the invention, the weight ratio of first sterically hindered amine and second sterically hindered amine contained in the amine mixture can be in the range of upwardly to 10:1. In other cases, the amine mixture of the absorbent composition can have a weight ratio of the first sterically hindered amine to the second sterically hindered amine in the range of from 2.5:1 to 8:1, preferably, from 2.8:1 to 7:1, and, more preferably, from 3:1 to 6:1.

In one embodiment of the invention, the absorbent composition comprises the amine mixture, as described above, in combination with water to thereby provide or form an aqueous solvent that is a component of the absorbent composition.

The amine mixture component of the aqueous solvent is generally present in an amount in the range of from 20 wt. % to 70 wt. % and the water component is generally present in an amount in the range of from 30 wt. % to 80 wt. %. The weight percent values recited for these components are based on the total weight of the aqueous solvent or the amine mixture plus water.

It is preferred for the aqueous solvent to comprise from 25 wt. % to 65 wt. % amine mixture, or from 35 wt. % to 55 wt. % amine mixture. It is more preferred for the amine mixture to be present in the aqueous solvent in the range of from 40 wt. % to 50 wt. %.

The water content of the aqueous solvent can be in the preferred range of from 35 wt. % to 75 wt. %, or from 45 wt. % to 65 wt. %, and, more preferred, the water content is from 50 wt. % to 60 wt. %.

It has been discovered that one problem with the use of the amine mixture or the aqueous solvent in the absorption treatment of gas mixtures is that it separates into several phases at temperatures falling within the range of regeneration temperatures for the amine mixture or aqueous solvent. The amine mixture or aqueous solvent can be used in processes for the treatment gas streams having concentrations of acidic gases and the removal of gases therefrom. These processes may use systems for treating the gas streams, wherein the systems include a contacting column and a regenerator system that includes a regenerator column which is usually equipped with a reboiler.

The contacting column of the treating system provides means for contacting a lean amine mixture or a lean aqueous solvent with a gas stream or mixture, having a concentration of one or more acidic gas components, such as $H_2S$, to yield a treated gas stream and an $H_2S$ rich amine mixture or $H_2S$ rich aqueous solvent. The regenerator system provides means for receiving and regenerating the $H_2S$ rich amine mixture or $H_2S$ rich aqueous solvent to yield the $H_2S$ lean amine mixture or $H_2S$ lean aqueous solvent for introduction into and use within the contacting column.

A regenerator system typically includes a regenerator column that provides means for separating the absorbed acid gas components from the $H_2S$ rich amine mixture or $H_2S$ rich aqueous solvent. Operatively connected or associated with the regenerator column is a reboiler that provides means for introducing heat into the amine mixture or aqueous solvent and to otherwise provide heat energy for the operation of the regenerator system. In the operation of the regeneration system, the regeneration temperature can vary depending upon the operating pressure of the regenerator and the composition of the amine mixture or aqueous solvent being regenerated.

Typically, the regeneration temperature is within the range of from 80° C. to 150° C. A more specific regeneration temperature is in the range of from 85° C. to 140° C., and, especially more specific, the regeneration temperature is in the range of from 90° C. to 130° C.

As mentioned earlier, it has been discovered that the amine mixture and aqueous solvent compositions tend to separate into two or more liquid phases at certain elevated temperature conditions. Particularly, the amine mixture or aqueous solvent is thought to phase separate under the conditions at which the aforementioned regenerator system is operated. This phase separation phenomenon is unexpected; since, certain teachings within the prior art indicate that various mixtures of severely hindered amines that are different from the amine mixtures defined herein do not phase separate under conditions of regeneration. The phase separation is not desired and may pose certain operating problems or, at least, contribute to higher cost of operation of gas treating systems.

It has been found, however, that certain problems associated with phase separation that occur with the amine mixture and aqueous solvent may be solved by the use and application of an organic co-solvent. Thus, a further improved absorbent composition beyond the amine mixture and aqueous solvent as described herein is provided by incorporating an amount of organic co-solvent with the amine mixture or aqueous solvent at a concentration that is effective to promote the miscibility of the individual components of the amine mixture or of the aqueous solvent.

The specific organic co-solvent may suitably be selected from the group of organic compounds consisting of sulfones, sulfone derivatives, and sulfoxides. These compounds are defined and described in great detail in U.S. Pat. Nos. 4,112,051; 3,347,621; and 3,989,811, all of which patents are incorporated herein by reference. The preferred organic co-solvent is a sulfone, and, among the sulfones, a substituted or unsubstituted cyclotetramethylene sulfone (sulfolane) is the more preferred. The most preferred sulfone is sulfolane.

The sulfone compounds of the inventive absorption composition have the general formula:

wherein at least four of the R substituents are hydrogen radicals and any remaining Rs being alkyl groups having from 1 to 4 carbon atoms. It is preferred that no more than two alkyl substituents are appended to the tetramethylene sulfone ring.

Suitable sulfone derivatives include 2-methyl tetramethylene sulfone; 3-methyl tetra methylene sulfone; 2,3-dimethyl tetramethylene sulfone; 2,4-dimethyl tetramethylene sulfone; 3,4-dimethyl tetramethylene sulfone; 2,5-dimethyl tetramethylene sulfone; 3-ethyl tetramethylene sulfone; 2-methyl-5-propyl tetramethylene sulfone as well as their analogues and homologues.

An embodiment of the absorbent composition of the invention, therefore, can include a combination of the organic co-solvent and the aqueous solvent which, as described herein, includes the amine mixture and water.

The aqueous solvent component of the absorbent composition can be present in an amount in the range of from or about 75 wt. % to or about 98 wt. %, with the weight percent being based on the total weight of the absorbent composition (i.e. the aqueous solvent plus organic co-solvent). It is preferred for the aqueous solvent component to be present at a concentration in the range of from 85 wt. % to 97.5 wt. %, more preferred, from 90 wt. % to 97 wt. %, and, most preferred, from 92 wt. % to 96.5 wt. %.

As for the organic co-solvent component of the absorbent composition, the amount present in the absorbent composition should be such that it is effective to promote the miscibility of the components of the aqueous solvent especially at the elevated temperatures at which such components are at least partially immiscible. This concentration level of organic co-solvent can be in the range of from or about 2 wt. % to or about 25 wt. %, with the weight percent being based on the total weight of the absorbent composition.

The preferred concentration of organic co-solvent in the absorbent composition is in the range of from 2.5 wt. % to 15 wt. %, more preferred, from 3 wt. % to 10 wt. %, and, most preferred, from 3.5 wt. % to 8 wt. %.

The absorbent composition of the invention is useful in the treatment of gaseous mixtures comprising acidic gas components by the absorption removal of the acidic gas components therefrom. The absorbent composition is particularly useful in the selective removal of $H_2S$ from gaseous streams that comprise both $H_2S$ and $CO_2$. This is accomplished by contacting, under absorption conditions, the gaseous stream with the absorbent composition typically by utilizing an absorber or contacting vessel. The absorber is operated under suitable contacting or absorption process conditions for the selective absorption and removal of the $H_2S$ from the gaseous stream.

Generally, the absorption step is conducted by feeding the gaseous stream into the lower portion of an elongated contacting or absorption vessel that defines a contacting or absorption zone. The contacting or absorption zone is typically equipped with contacting trays or packing or any other suitable means for promoting the contacting of the absorbent composition with the gaseous stream.

The absorbent composition that is lean in $H_2S$ is introduced into upper portion of the elongated vessel and flows countercurrently with the gaseous stream that is introduced into the lower portion of the vessel. As the absorbent composition passes through the contacting vessel it is contacted with the gaseous stream and selectively removes $H_2S$ from the gaseous stream. A treated gas stream having a reduced concentration of $H_2S$ is yielded from the upper end of the vessel and the absorbent composition rich in $H_2S$ is yielded from the bottom portion of the vessel.

The inlet temperature of the $H_2S$ lean absorbent composition, and, thus, the contacting temperature of the $H_2S$ lean absorbent composition with the gaseous mixture, typically is in the range of from or about 5° C. to or about 50° C. and, more typically, from 10° C. to 45° C.

The operating pressure of the absorption vessel is typically in the range of from 5 psia to 2,000 psia, but, more suitably, it is in the range of from 20 to 1,500 psia.

The $H_2S$ rich absorption composition from the absorber may be regenerated by any suitable means or method for providing the $H_2S$ lean absorbent composition for use in the absorber contactor. In one typical regeneration step, the $H_2S$ rich absorption composition is introduced into a regenerator vessel of a regeneration system for receiving and regenerating the $H_2S$ rich absorption composition to yield the $H_2S$ lean absorbent composition. The regenerator vessel defines a regeneration zone into which the $H_2S$ rich absorption composition is introduced and the regenerator vessel provides means for regenerating the $H_2S$ rich absorption composition by stripping the absorbed $H_2S$ therefrom.

The regenerator is typically equipped with a reboiler that provides heat energy for stripping the $H_2S$ and other acidic gas components from the $H_2S$ rich absorption composition. The regeneration temperature is typically in the range of from or about 80° C. to or about 170° C., and, more typically, from 85° C. to 140° C.

The regeneration pressure is typically in the range of from 1 psia to 50 psia, more typically, from 15 psia to 40 psia, and, most typically, from 20 psia to 35 psia.

In one embodiment of the invention, provided is a method of improving a process for the selective removal of hydrogen sulfide from gas streams that comprise hydrogen sulfide and carbon dioxide. In these processes, certain conventional absorption and regeneration process systems are used for the treatment of gas streams containing acidic gas components. These process systems typically contain an inventory of an amine absorbent that includes an $H_2S$ lean amine and an $H_2S$ rich amine. The process system further includes a contacting column for contacting the $H_2S$ lean absorbent with the gas stream to yield a treated gas stream and the $H_2S$ rich absorbent and a regenerator for receiving and regenerating the $H_2S$ rich absorbent from the contacting column to yield the $H_2S$ lean absorbent that is introduced into the contacting column. This process is improved either by providing or replacing the amine absorbent with the absorbent composition of the invention.

Thus, in one embodiment of the invention, a method is provided for improving a process which utilizes an amine absorbent composition for the selective removal of hydrogen sulfide form a gas stream containing hydrogen sulfide and carbon dioxide. In this method, the absorbent composition of the invention, as described in detail herein, is provided and utilized in the absorption treatment of the gas stream in the manner and by the methods as more fully described elsewhere herein.

Figure 1:
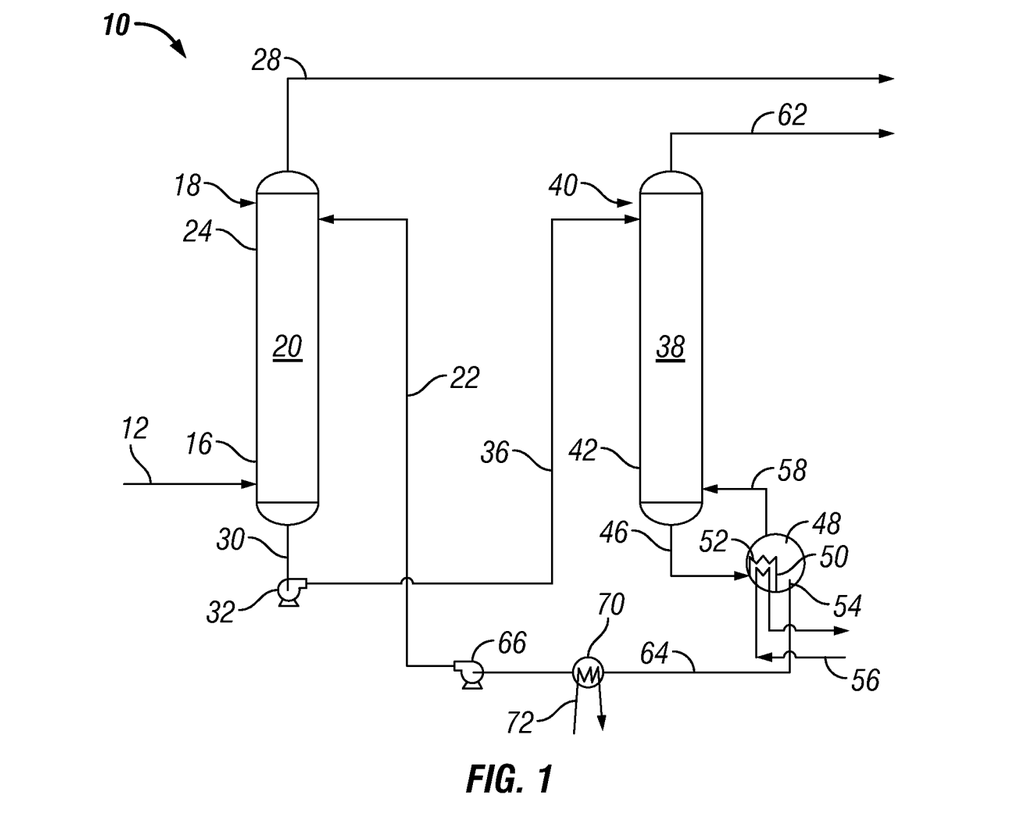
FIG. 1 is a schematic flow diagram illustrating an absorption-regeneration system for treating gaseous streams that contain $H_2S$ and $CO_2$ to selectively remove $H_2S$ therefrom.

Reference is now made to FIG. 1, which is a schematic flow representation of absorption-regeneration system 10 for treating gaseous streams that contain hydrogen sulfide and carbon dioxide, particularly, to selectively remove hydrogen sulfide from the gaseous stream and to yield a treated gas having a reduced hydrogen sulfide concentration. The gaseous stream, comprising $H_2S$ and $CO_2$, that is to be treated passes by way of conduit 12 and is introduced, preferably, into the lower portion 16 of contactor/absorber 18.

Contactor/absorber 18 defines a contacting/absorption zone 20, wherein an $H_2S$ lean absorbent composition of the invention is contacted with the gaseous stream under absorption conditions for providing the selective absorption of $H_2S$ from the gaseous stream by the $H_2S$ lean absorbent composition.

The $H_2S$ lean absorbent composition passes by way of conduit 22 and is introduced, preferably, into contacting/absorption zone 20 of the upper portion 24 of contactor/absorber 18. The $H_2S$ lean absorbent composition passes through contacting/absorption zone 20 wherein it is contacted in a countercurrent fashion with the gaseous stream also passing through contacting/absorption zone 20 to thereby selectively absorb the $H_2S$ contained in the gaseous stream.

A treated gas stream, having a reduced concentration of $H_2S$, is yielded and withdrawn from contacting/absorption zone 20 and passes by way of conduit 28 to downstream. An $H_2S$ rich absorbent composition is yielded and withdrawn from contacting/absorption zone 20 and passes by way of conduit 30 to pump 32 that defines a pumping zone and provides means for imparting pressure energy into and conveying the $H_2S$ rich absorbent composition.

The $H_2S$ rich absorbent composition passes by way of conduit 36 from pump 32 for introduction into regeneration zone 38, which is defined by regenerator 40. Regenerator 40 provides means for receiving and regenerating the $H_2S$ rich absorbent composition to yield the $H_2S$ lean absorbent composition and off-gas, comprising $H_2S$. Typically, the $H_2S$ rich absorbent composition flows downwardly through regeneration zone 38 and exits the lower portion 42 of regenerator 40 through conduit 46.

A bottoms stream then passes from regeneration zone 38 to reboiler 48. Reboiler 48 defines a reboiling zone (not labeled) wherein heat energy is introduced for use in vaporizing a portion, principally water, of the bottoms stream and for driving the $H_2S$ therefrom. Any suitable type of reboiler known to those skilled in the art may be used as reboiler 48, but the one represented is a kettle-type reboiler having an internal weir 50 that defines within reboiler 48 a liquid volume section 52 on one side of internal weir 50 and reboiler sump section 54 on the other side of internal weir 50. Heat energy is introduced into the liquid volume section 52 by passing through steam coil 56. Vapor, which can comprise $H_2S$ and water, passes from reboiler 48 by way of conduit 58 to lower portion 42 of regenerator 40.

An off-gas stream, comprising $H_2S$, is yielded and passes from regenerator 40 by way of conduit 62. Hot $H_2S$ lean absorbent composition is withdrawn from reboiler sump section 54 and passes therefrom by way of conduit 64 to pump 66. Interposed in conduit 64 is heat exchanger 70. Heat exchanger 70 defines a heat transfer zone and provides means for cooling the hot $H_2S$ lean absorbent composition, preferably by indirect heat exchange with cooling water passing through cooling tubes 72 to thereby provide the cooled $H_2S$ lean absorbent composition that passes to pump 66. Pump 66 provides for conveying the cooled $H_2S$ lean absorbent composition by way of conduit 22 for introduction into and reuse in contacting/absorption zone 20 of contactor/absorber 18.

The following examples are provided to illustrate certain embodiments of the invention, but they should not be considered as limiting the invention in any respect.

EXAMPLE 1

This Example 1 describes the experiment for testing certain phase separation characteristics of various embodiments of the inventive absorbent composition and the effect of the organic co-solvent (sulfolane) on phase separation at elevated temperatures. Presented in Table 1 are the results of the testing.

The amine mixture used in preparing the compositions for this Example 1 and the other examples herein was an amination reaction product prepared by the catalytic reaction of tert-butylamine in the presence of a nickel amination catalyst, as described herein, at a reaction temperature of 200° C. and a reaction pressure of 2,000 psig with a polydispersed polyethylene glycol (PEG) mixture of an average molecular weight in the range of from 180 to 1000, and, in particular, a PEG mixture with an average molecular weight of about 240.

Various solutions of the amine mixture, water and the organic co-solvent, sulfolane, were prepared and placed in sealed glass tubes. All of the solutions were clear and exhibited a single phase at room temperature. The sealed glass tubes were placed in a silicone oil bath and heated. As the temperature of the solutions increased, many became cloudy and exhibited phase separation at various temperatures.

Presented in Table 1 are the compositions of the various solutions or absorbent compositions that were tested and the temperatures at which separation into several liquid phases were observed for each. It is desirable for there to be no liquid-liquid phase separation of the components at a temperature of at least greater than 120° C.

TABLE 1

Absorbent compositions and temperatures at which phasing occurs.

| Sample No. | Amine Mixture (wt. %) | Water (wt. %) | Sulfolane (wt. %) | Temperature at which Phasing was observed (° C.) |
|---|---|---|---|---|
| 1 | 40 | 60 | 0 | 120 |
| 2 | 29.9 | 70.1 | 0 | 110 |
| 3 | 20 | 80 | 0 | 100 |
| 4 | 11.9 | 88.1 | 0 | 105 |
| 5 | 34.8 | 52.3 | 12.9 | >120 |
| 6 | 26 | 60.7 | 13.3 | >120 |
| 7 | 17.1 | 68.6 | 14.3 | >120 |
| 8 | 10.2 | 75.2 | 14.6 | >120 |
| 9 | 37.9 | 56.8 | 5.3 | >120 |
| 10 | 36.3 | 54.5 | 9.2 | >120 |
| 11 | 19 | 76 | 5 | 114.6 |
| 12 | 18.1 | 72.9 | 9 | >120 |

This Example shows that the aqueous solvent (i.e., amine mixture and water) phase separates, over a range of elevated temperatures. This Example also demonstrates that liquid phase separation occurs over a wide range of concentrations of the amine mixture component of the absorbent composition (solution). The data show that solutions having a concentration of the amine mixture component of around 20 wt. % require more co-solvent in order to maintain a single liquid phase. This is shown by the results for sample numbers 3, 11 and 12. At this concentration level for the amine mixture component, the amount of co-solvent required to prevent the phase separation or maintain the single phase at the elevated temperatures is in the range of from 5 wt. % to 9 wt. %.

EXAMPLE 2

This Example describes the experimental testing equipment and procedure used in determining temperatures at which liquid-liquid phase separation occurs for several different absorbent compositions and presents the results of the experiments.

The laboratory unit used to conduct the experiments included an absorber, a regenerator equipped with a steam supplied kettle-type reboiler, and associated pumps, exchangers and instrumentation. The sample point for the absorbent composition was located at the outlet from the over-flow section (sump section) of the kettle-type reboiler.

The kettle-type reboiler of the laboratory unit defined a heating zone. Provided within the heating zone was an internal weir that maintained on one side a level of liquid at the height of the internal weir. The internal weir, thus, provided for a liquid volume and for an overflow of the liquid into a sump section of the kettle-type reboiler on the opposite side of the internal weir. Liquid was withdrawn from the sump section for transfer and conveyance to a contact absorber. A heating coil capable of receiving and passing steam therethrough was provided that passed through the liquid volume that resided behind the internal weir. The kettle-type reboiler also was equipped with an outlet conduit that provided for the withdrawal of vapor from the heating zone and conveyance thereof to the regenerator of the laboratory unit.

The laboratory unit was operated such that the absorber pressure ranged from 8 to 11.5 psig (median of 8.7 psig), the regenerator pressure ranged from 6.9 to 11 psig (median of 9.4 psig), and the lean solvent temperature to the absorber of approximately 70° C. while the solvent was being circulated through the system.

In the experimental runs of this Example 2 in which multiple liquid phases were formed in the liquid volume, it is believed that at least a light phase and a heavy phase were formed with the light phase residing above the heavy phase. The light phase would overflow the internal weir into the sump section of the kettle-type reboiler. This mechanism accounts for the different compositions of the liquid phases of the absorbent composition before and after the separation of the absorbent solution into the several liquid phases upon heating.

The compositions of the absorbent solutions and the results of the testing are presented in Table 2.

Run No. 1

Solution No. 1 (45% amine mixture, 55% water, no sulfolane) was placed in the laboratory unit and circulated. When the reboiler temperature reached 93° C. a sample was removed from the overflow internal weir compartment of the reboiler and titrated with a standard acid solution. The titration of the solution sampled from the overflow internal weir compartment consumed 22 ml of acid. The circulation of the solution continued until the reboiler temperature reached 113° C. The titration of the solution sampled from the overflow internal weir compartment when the reboiler was at a temperature of 113° C. consumed 10 ml of acid. These data indicate that the solution, i.e., aqueous solvent comprising the amine mixture of the invention and water with an absence of an organic co-solvent such as sulfolane, separated into at least two liquid phases at a temperature greater than 93° C. and at or below 113° C.

Run No. 2

Solution No. 2 (42.8% amine mixture, 52.4% water, 4.8 wt. % sulfolane) was placed in the laboratory unit and circulated. When the reboiler temperature reached 87° C. a sample was removed from the overflow internal weir compartment of the reboiler and titrated with a standard acid solution. The titration of the solution sampled from the overflow internal weir compartment consumed 21.7 ml of acid. The circulation of the solution continued until the reboiler temperature reached 120° C. The titration of the solution sampled from the overflow internal weir compartment consumed 10.5 ml of acid. These data indicate that the solution phase-separated at a temperature greater than 87° C. and at a temperature at least or below 120° C. and that a 4.8 wt. % sulfolane was not sufficient to prevent phase separation of the solution.

Run No. 3

Solution No. 3 (40.9% amine solution, 50 water, 9.1 wt. % sulfolane) was placed in the laboratory unit and circulated. During the circulation of the solution through the system, when the reboiler temperature was approximately 120° C., samples were removed at periodic intervals from the overflow internal weir of the reboiler and titrated with a standard acid solution. The titration of the first sample of the solution, when the reboiler temperature was 120.8° C., consumed 20.5 ml of acid. The titration of the solution samples taken after another 30 minutes, 41 minutes, 167 minutes, and 284 minutes, respectively, consumed 20 ml acid, 20.1 ml acid, 20 ml acid, and 19.9 ml acid.

These data indicate that the use of 9.1 wt. % sulfolane co-solvent in the solution prevented phase separation of the solution at a typical reboiler temperature of around 120° C. and that the prevention of the liquid-liquid phase separation was maintained over time.

Run No. 4

Solution No. 4 (42.3% amine solution, 51.7% water, 6 wt. % sulfolane) was placed in the laboratory unit and circulated. A sample of the solution was titrated with a standard acid solution when it was at room temperature, and it consumed 20 ml of acid. The solution was circulated through the system. When the reboiler temperature reached 113° C. a sample was taken from the overflow internal weir compartment of the reboiler and titrated with a standard acid solution. The titration of the solution sampled consumed 19.9 ml of acid. These data indicate that 6 wt. % sulfolane was sufficient to maintain the liquid phase of the solution in a single phase and to prevent liquid-liquid phase separation of the solution.

TABLE 2

Absorbent compositions and titration results indicating the occurrence of phase separation at various reboiler temperatures.

| Run No. | Amine Mixture weight units (wt. %) | Water weight units (wt. %) | Sulfolane weight units (wt. %) | Titration of Liquid from Reboiler Sump when Liquid was at Reboiler Temp (1) (ml) | Reboiler Temp (1) (° C.) | Titration of Liquid from Reboiler Sump when Liquid was at Reboiler Temp (2) (ml) | Reboiler Temp (2) (° C.) |
|---|---|---|---|---|---|---|---|
| 1 | 5850 (45%) | 7150 (55%) | 0 (0%) | 22 | 93 | 10 | 113 |
| 2 | 5850 (42.8%) | 7150 (52.4%) | 650 (4.8%) | 21.7 | 87 | 10.5 | 120 |
| 3 | 5850 (40.9%) | 7150 (50.0%) | 1300 (9.1%) | 20.7 | 120 | 20 | 120 |
| 4 | 5850 (42.3%) | 7150 (51.7%) | 830 (6%) | 20 | Room Temp | 19.9 | 113 |

The data presented above show that liquid-liquid phase separation of the absorbent composition within an absorption/regeneration system for the treatment of gas streams having a concentration of an acidic gas component occurs at typical reboiler operating temperatures. Also, the data show that the use or application of an organic co-solvent, such as the sulfone, sulfolane, can prevent phase separation of the amine mixture component of the absorbent composition that appears to occur at elevated temperatures. For certain aqueous solvents, which include the amine mixture of the invention and water as components, a sulfolane concentration in the range of from about 5 wt. % to about 10 wt. % provide for the miscibility of the components at the elevated temperatures and contribute to the inhibition of the phase separation of the components of the absorbent.

EXAMPLE 3

This Example describes the experimental testing equipment and procedure used in measuring certain selectivity properties of the inventive absorbent composition versus a comparison absorbent, N-methyl diethanolamine (MDEA), in the removal of $H_2S$ relative to $CO_2$ from a gas stream containing $H_2S$ and $CO_2$.

A stirred-cell absorption vessel was used to conduct the experiments. The reactor vessel was one liter glass reactor provided with liquid phase sample ports, adjustable stirring paddles for the vapor and liquid phases, thermal jacketing, a thermocouple port, a gas inlet and a gas outlet.

In conducting the experiment, the glass vessel was filled with 750 ml (at ambient temperature) of the absorbent composition (either the amine mixture of the invention or MDEA) leaving about 250 ml of vapor volume. The surface of the liquid was maintained as a quiet planar interface during the stirring of the vapor and liquid phases at a rate of 100 rpm. The temperature was maintained at approximately 25° C.

The gas introduced into the inlet port of the vessel comprised 89 mole % nitrogen, 1 mole % $H_2S$ and 10 mole % $CO_2$. The $H_2S$ and $CO_2$ concentration of the outlet gas stream was monitored.

Figure 2:
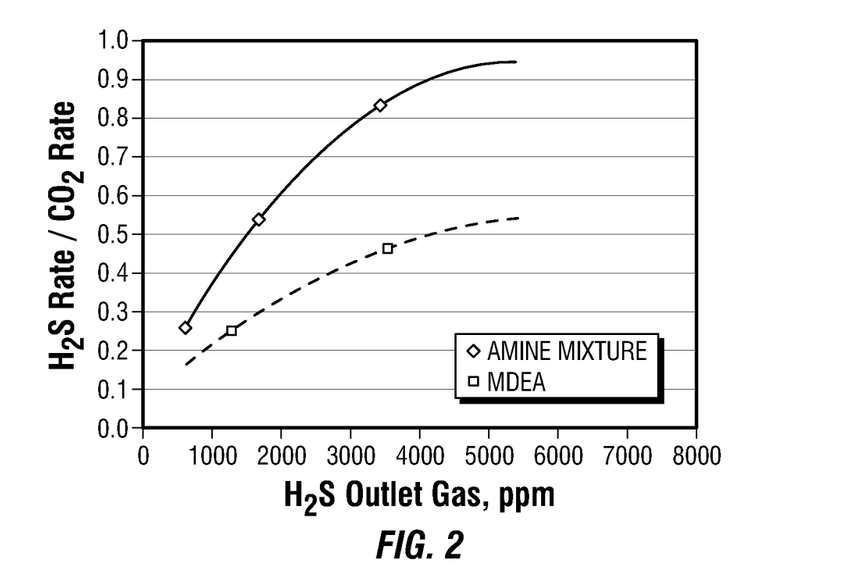
FIG. 2 presents plots of the measured rate ratios ($H_2S$ absorption rate/$CO_2$ absorption rate) as a function of $H_2S$ in the treated gas for the amine mixture of the invention and for MDEA.

Presented in FIG. 2 are selected results from the testing.

FIG. 2 presents plots of the measured rate ratio of the $H_2S$ absorption rate (mole $H_2S/m^2$/sec) to the $CO_2$ absorption rate (mole $CO_2/m^2$/sec) as a function of the $H_2S$ concentration in the outlet gas for the amine mixture of the invention and for MDEA. As can be observed from the presented plots, the rate ratio for the amine mixture is consistently greater than the corresponding rate ratio for the MDEA. This indicates that the $H_2S$ absorption selectivity of amine mixture is greater than the $H_2S$ absorption selectivity of MDEA.

EXAMPLE 4

This Example presents the experimental results from testing the inventive amine mixture and a comparison solvent, MDEA, to determine the effect of $CO_2$ on $H_2S$ slip from an absorber and the effect of $CO_2$ on the percent $CO_2$ absorption.

The laboratory unit described in Example 2 was used to conduct the experiments of this Example 4. Certain of the results from these experiments are presented in FIG. 3 and FIG. 4. The gas feed charged to the absorber comprised $H_2S$ at a targeted concentration of from 0.6 to 0.7 mole %. The $CO_2$ concentration of the gas feed was that as expressed along the abscissa (x) axis of the plots of FIG. 3 and FIG. 4, and the balance of the gas feed was $N_2$ gas.

Figure 3:
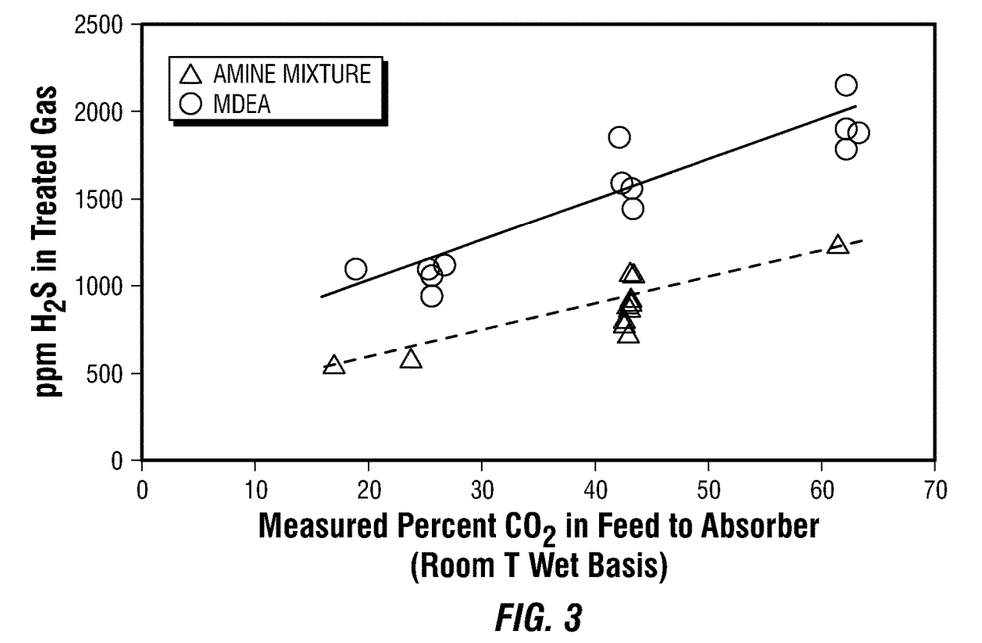
FIG. 3 presents plots of the measured $H_2S$ concentration in a treated gas as a function of the $CO_2$ contained in the gas to be treated provided by the amine mixture of the invention and MDEA.

FIG. 3 graphically presents the measured $H_2S$ concentration in the treated outlet gas from the reactor vessel as a function of the $CO_2$ contained in the inlet gas to the reactor vessel for the amine mixture of the invention and MDEA. As may be observed from the data presented, the amine mixture provides for a significantly lower $H_2S$ concentration in the treated gas for a given $CO_2$ concentration in the inlet gas to the reactor vessel. This indicates that the amine mixture provides for a much greater $H_2S$ removal than does the MDEA for all levels of $CO_2$ concentration of a gas to be treated.

Figure 4:
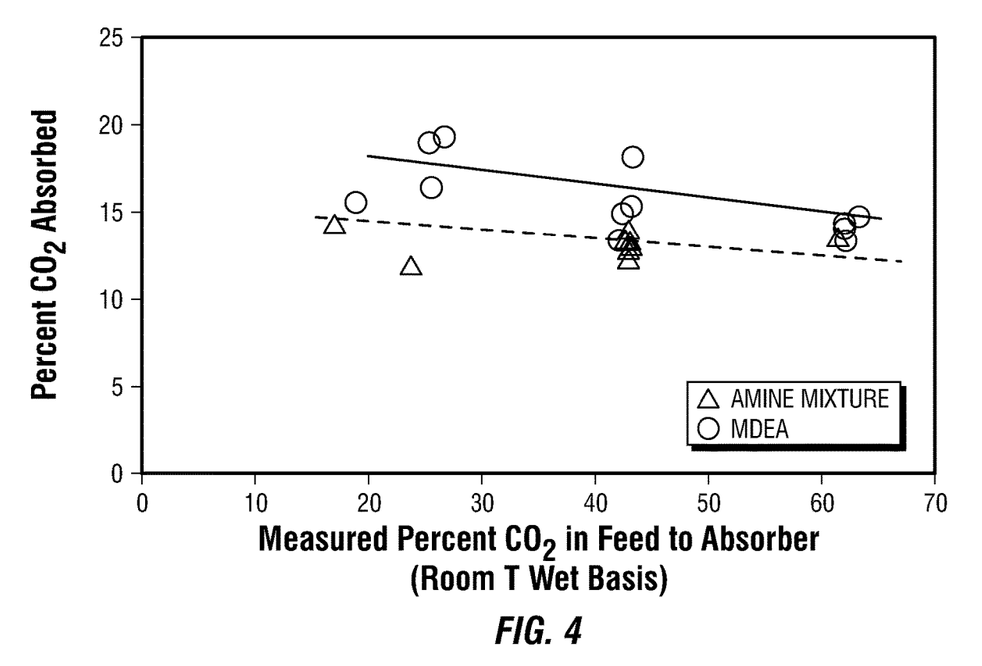
FIG. 4 presents plots of the percentage of the total $CO_2$ contained in a feed gas stream that is absorbed either by the amine mixture of the invention or by MDEA as a function of the concentration $CO_2$ in the feed gas stream.

FIG. 4 graphically presents the measured percentage of the $CO_2$ that is contained in an inlet gas to the reactor vessel that is removed by absorption with the amine mixture and with MDEA as a function of the concentration of $CO_2$ in the inlet gas to the reactor vessel. These data indicate that the amine mixture is less effective in absorbing $CO_2$ from a gas stream than is MDEA. This is a good characteristic for the amine mixture; since, a higher selectivity in the absorption of $H_2S$ relative to the absorption of $CO_2$ is desired.

That which is claimed is:

1. An absorbent composition, comprising: (a) from 75 wt. % to 98 wt. %, based on the total weight of said absorbent composition, of an aqueous solvent; and (b) from 2 wt. % to 25 wt. %, based on the total weight of said absorbent composition, of an organic co-solvent, wherein said aqueous solvent comprises from 20 wt. % to 70 wt. %, based on the total weight of said aqueous solvent, of an amination reaction product of a polydispersed polyethylene glycol (PEG) mixture having an average molecular weight that is in the range of from 180 to 1000 and t-butylamine, and from 30 wt. % to 80 wt. % water, based on the total weight of said aqueous solvent, and wherein said organic co-solvent is selected from the group consisting of sulfones, sulfone derivatives, and sulfoxides.

2. An absorbent composition as recited in claim 1, wherein said PEG mixture comprises polyethylene glycols of the formula $HOCH_2(CH_2OCH_2)CH_2OH$, wherein n is an integer selected from values in the range of from 1 to 24.

3. An absorbent composition as recited in claim 1, wherein said aqueous solvent is present in said absorbent composition in an amount in the range of from 85 wt. % to 97.5 wt. %, wherein said average molecular weight of said PEG mixture is in the range of from 180 to 400, and wherein said organic co-solvent present in said absorbent composition is in an amount in the range of from 2.5 wt. % to 15 wt. %.

4. An absorbent composition as recited in claim 1, wherein said amination reaction product further comprises at least a first sterically hindered amine and a second sterically hindered amine.

5. An absorbent composition as recited in claim 4, wherein said first sterically hindered amine is selected from the group of amine compounds of the formula:
$(CH_3)_3CNH(CH_2CH_2O)_xCH_2CH_2NHC(CH_3)_3$, wherein x is an integer in the range of from 2 to 16; and
wherein said second sterically hindered amine is selected from the group of amine compounds having the following formula:
$(CH_3)_3CNH(CH_2CH_2O)_xCH_2CH_2OH$, wherein x is an integer in the range of from 2 to 16.

6. An absorbent composition as recited in claim 5, wherein said amination reaction product has a weight ratio of said first sterically hindered amine to said second sterically hindered amine that is in the range upwardly to 10:1.

7. An absorbent composition as recited in claim 6, wherein said amination reaction product has a weight ratio of said first sterically hindered amine to said second sterically hindered amine that is in the range of from 2.5:1 to 8:1.

* * * * *

UNITED STATES PATENT AND TRADEMARK OFFICE
CERTIFICATE OF CORRECTION

PATENT NO.          : 11,071,944 B2
APPLICATION NO.     : 14/402382
DATED               : July 27, 2021
INVENTOR(S)         : James Edward Critchfield et al.

Page 1 of 1

It is certified that error appears in the above-identified patent and that said Letters Patent is hereby corrected as shown below:

In the Specification

In Column 2, Line 3, delete "aminoacid." and insert -- amino acid. --, therefor.

In Column 2, Line 5, delete "aminoacid" and insert -- amino acid --, therefor.

In the Claims

In Column 16, Line 25, in Claim 2, delete "OCH$_2$)CH$_2$" and insert -- OCH$_2$)$_n$CH$_2$ --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*